Nov. 16, 1943.  A. C. PERBAL  2,334,436
JOINT FOR ELECTRICAL FIXTURES
Filed Feb. 26, 1942
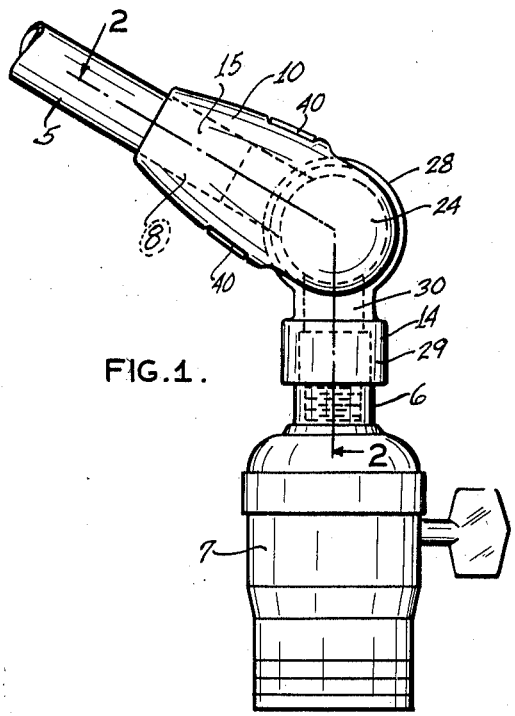
FIG. 1.
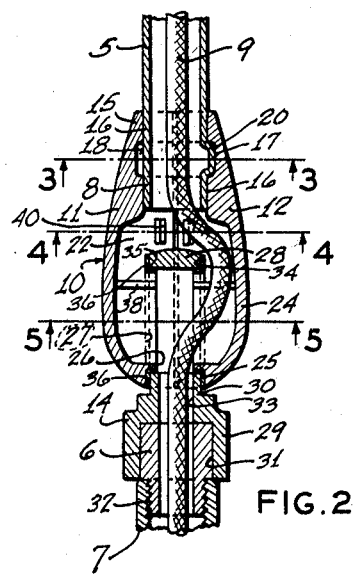
FIG. 2.
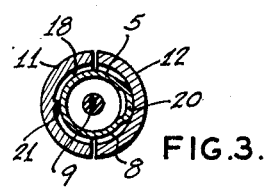
FIG. 3.
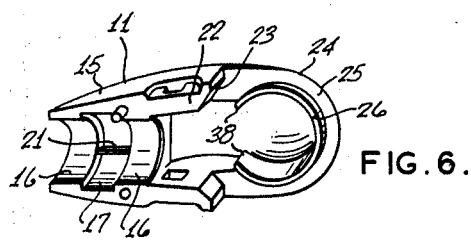
FIG. 6.
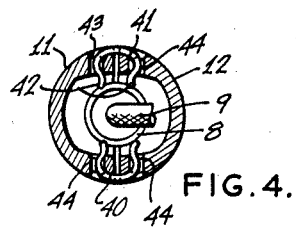
FIG. 4.
FIG. 7.
FIG. 9.
FIG. 8.
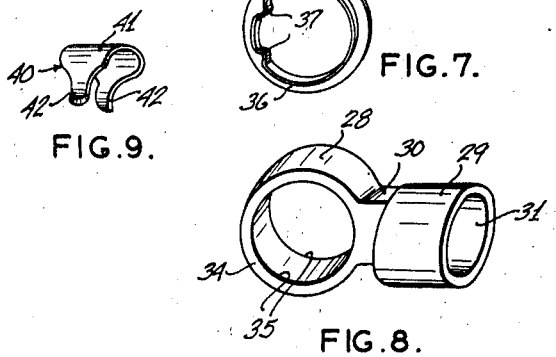
FIG. 5.
INVENTOR.
ALBERT C. PERBAL
BY Lawrence H. Cohn
ATTORNEY Patented Nov. 16, 1943

2,334,436

UNITED STATES PATENT OFFICE 2,334,436

JOINT FOR ELECTRICAL FIXTURES

Albert C. Perbal, University City, Mo.

Application February 26, 1942, Serial No. 432,415

2 Claims. (Cl. 174—86)

My invention relates to improvements in brackets for electrical fixtures and the like, and has particular reference to an improved joint for connecting members of an adjustable bracket arm.

An object of my invention is to provide a joint of generally elbow character, for connecting adjacent members of a bracket arm or like structure, wherein the joint affords substantially universal adjustability of one connected member relative to the other, and is so constructed as to offer frictional resistance to the relative adjustments of the bracket members, of a degree which will assure maintenance of any such adjustment.

Another object of my invention resides in the provision of a joint of this character which is especially suitable for use in articulated arms of an electrical fixture bracket, and which for this purpose, is so constructed as to provide adequate space within the joint for the relatively free extension of electrical conductors therethrough, and to afford protection for the conductor by preventing rubbing action thereon by the joint body.

A further object of my invention is to provide an improved and compact joint comprised of relatively few parts which may be economically manufactured and quickly assembled, and wherein the parts are held together in assembly by resilient connector elements or spring clips which may be easily manually applied or removed.

Other objects and advantages of my invention will appear readily from the following description of a preferred embodiment thereof, as exemplified in the accompanying drawing.

In the drawing, Fig. 1 is a side elevational view of my improved elbow joint, shown as applied to adjacent ends of members of an electrical fixture arm or bracket; Fig. 2 is a view in longitudinal section through the joint, as taken along the line 2—2 of Fig. 1; Figs. 3, 4 and 5 are transverse sectional views of the joint as taken respectively, along the lines 3—3, 4—4 and 5—5 in Fig. 2, each showing features of my improved construction; Fig. 6 is a view in perspective, of one of a pair of complemental joint elements constituting the body of my improved joint; Fig. 7 is a perspective view of a ring member employed in my device; Fig. 8 is a view in perspective, of an arm member of the joint, and Fig. 9 illustrates in perspective, a spring clip element provided for securing the several parts of the joint in assembly.

According to the present exemplary disclosure, my improved device is shown as applied by way of illustration only, to the connection of members 5 and 6 of an adjustable electrical fixture bracket providing the support for an electrical device such as the lamp socket 7. The bracket members 5 and 6, the former being here shown only in part including its joint connected end 8, may be of hollow or tubular form to provide for the extension of electrical conductors therethrough, as the conductor cable 9 appearing in Fig. 2.

With reference now to the construction of my improved joint, the presently preferred form thereof as illustrated, presents a body section 10 comprised of a pair of complemental or companion body elements 11 and 12 (Fig. 2), these elements in assembly affording pivotal support for a further member 14 of the joint. The companion elements 11 and 12 are by preference, unitary or one-piece shell-like members formed from suitable rigid material, and each having the general formation as shown by the perspective view of Fig. 6. Extending longitudinally of corresponding ends 15 of these elements, are curved bearing surfaces 16 provided for engagement with the end 8 of the bracket arm 5, and serving in the assembly of the body elements, to journal the body section 10 on the bracket arm. In order to prevent displacement of the assembled body section longitudinally of the bracket arm, recesses 17 are formed preferably in the mid-sections of the bearing surfaces 16, and these cooperate in the assembled body section, to form an annular channel 18 as indicated in Figs. 2 and 3. Received in this channel is an outstruck element or projection 20 (Fig. 2) on the end portion 8 of bracket arm 5, the projection 20 thereby being effective to constrain the body 10 against movement longitudinally of the bracket arm, while permitting by reason of the annular extent of the channel 18, rotational movement of the body on the arm. Although the channel 18 may be completely annular so as to allow unlimited turning of the body section of the joint relative to the arm end 8, where electrical conductors are extended through the joint as in the present example, it is desirable to restrict such turning in order to prevent inordinate twisting of the conductors which otherwise would very likely result in injury thereto. To this end then, the annular extent of the channel 18 may be rendered incomplete as by the provision of a suitable abutment in one or the other of the channel-recesses 17, such as the bar or stop element 21 shown in Figs. 3 and 6. Thus it will appear that the stop element 21 will abut the projection 20 in the course of turning the body section 10 on the arm end 8, and that by this provision, turning movement of the body section is definitely limited to slightly less than a full turn.

While the body section of the joint is thus capable of being turned relative to and coaxially of the bracket arm 5, provision is made for firm but yieldable retention of the body section in any position of rotary adjustment on the arm. The manner in which this is attained will be best understood following the description of the remainder of my improved joint structure.

In the formation of the companion shell-like members or body halves 11 and 12, the marginal wall portions 22 of each which extend longitudinally of the member from the end portion 15 containing the bearing surface 16, are terminated intermediate the ends of the member as at 23, the terminal ends of these walls being oppositely bevelled as shown in Fig. 6. The end portion 24 of the member beyond the wall terminals 23, is thereby reduced as clearly appears in Fig. 6, and this end portion is formed to provide a flat bearing seat 25 of arcuate trend. According to the presently preferred embodiment, the seat 25 is substantially three-quarter circular, or approximately 270 degrees in circular extent. Upstanding on the inner periphery of this bearing seat is a flange or shoulder 26 of substantially corresponding circular extent, the flange constituting a pivot bearing for the pivotal support of the member 14 of the joint. It will appear from the foregoing, that the reduced end portions 24 of the companion elements 11 and 12 cooperate in assembly, to provide an aperture 27 therebetween (Figs. 2 and 5) to receive a part of the member 14 presently to be described, and further, that the bearing seats 25 and flanges 26 are in opposed coaxial relation to provide the pivotal support for such portion of member 14, as thus will presently appear.

The member 14 of my improved joint is essentially a unitary structure comprising an annulus 28 from the periphery of which extends a substantially cylindrical element or head 29, these parts being joined by a neck 30. The head 29 is hollowed or recessed axially thereof, as at 31, to receive and mount the tubular bracket member 6 (Fig. 2), the latter having secured to it the lamp socket 7, as indicated by the threaded connection 32. Further, the neck 30 is longitudinally apertured as at 33, to provide a passage communicating with the open interior of the annulus 28 and the recess 31, this provision being made for the through extension of the conductor cable 9, as illustrated in Fig. 2.

In the assembly of the companion body elements 11 and 12 and the member 14, the annulus 28 of the latter is received in the aperture 27 between the reduced end portions 24 of the body halves, being journalled therebetween for pivotal movement about the flanges 26 as appears in Fig. 2. While the bearing seats 25 may bear directly against the opposite lateral faces 34 of the annulus, with the flanges 26 in direct contact with the opposite lateral portions 35 at the inner periphery of the annulus, it is preferred to interpose ring elements to provide the actual journalling contact between the body section and the annulus. Accordingly, a pair of these elements, one of which is illustrated in perspective by Fig. 7, are provided in the present assembly. The elements 36 may be formed of steel or other suitable material, and each is of flanged ring shape conforming to the surface 25 and flange 26 of the body members as clearly shown in the sectional view of Fig. 5. The ring flange may be inwardly deformed in spaced zones, as at 37 (Fig. 7) for abutment with the terminal ends 38 of the flange 26, whereby to preclude rotational movement of the rings about the flange 26. As appears in Fig. 2 the conductor 9 passes through the annulus or eye portion 28 of member 14 and thence longitudinally through the shell body 10. The rings 36 sheath the edges of the said eye portion and prevent direct contact therewith of the conductor 9, and since the rings are held fixed with respect to the shell body, the conductors or their insulating coverings are not rubbed against by the said eye portion when that part is rotated, with reduced wear on the conductors as a result.

In the assembly of the joint parts, the member 14 through its pivotal support as now described, may be pivotally displaced relative to the joint body as exemplified by the relation of these joint parts in Fig. 1. The extent of such movement is here limited by abutment of the neck 30 with the opposite wall terminals 23 of the body section, so that the element 14 is thus confined to substantially a 180 degree swing.

The companion elements or body halves 11—12 are secured together and in assembly with the annulus of the member 14 and the end 8 of the bracket arm 5, by novel fastening means employing attachment elements of spring-clip character which may be easily manually applied or removed. The fastening arrangement further is such as to leave the interior of the body section 10 substantially unobstructed, except for the portions of the bearing rings 36 and annulus 28 which extend transversely therethrough, whereby to provide for the relatively free extension of the conductor cable 9 longitudinally through the joint in the manner shown in Fig. 2. Referring particularly to Figs. 4, 6, and 9, a pair of clip elements 40 are formed from suitable spring material, and each has the general configuration as shown by the perspective view of Fig. 9. Each clip is of generally U-shape or saddle-form, providing a curved body portion 41 characterized by a degree of curvature corresponding substantially to the surface curvature of the companion elements 11 and 12, and spring arms 42 each appreciably reduced in the manner shown. To accommodate these securing elements, each of the elements 11 and 12 has its opposite wall portions 22 recessed in the external surface thereof, as at 43, and provided with apertures 44 transversely therethrough from the base of the recesses. The recesses and apertures in the adjacent corresponding walls 22 of the companion elements, cooperate when these body parts are brought together (Fig. 4), to receive the clip body 41 such that its curved outer surface is substantially flush with the outer surface of the assembled joint body section 10, and to receive the spring arms 42 through the apertures 44. These clips being thus disposed in the diametrically opposed position and straddling relation to the elements 11 and 12 as appears in Fig. 4, serve most effectively to connect these body elements and to hold them in assembly engagement with the annulus 28 of member 14, as well as with the end 8 of the bracket arm 5.

It is a further purpose of my invention to utilize the spring clips 40 not only for effecting assembly of the joint parts, but as tensioning elements for the body section 10, whereby the latter is caused to engage both the bracket arm 5 and the annulus 28 of the joint member 14 with such pressure as to effect yieldable frictional retention of the body section in any position of rotary adjustment on the end 8 of arm 5, and of the member 14 in any position of its swinging adjustment relative to the body section 10. To this end, the parts of the joint structure are relatively proportioned such that in the assembly of the body elements 11 and 12 to the annulus 28 and to the end 8 of bracket arm 5, these body elements as connected by the spring clips 40, will be slightly separated as this is indicated in Figs. 3 and 4. Also, the zone of application of the clips 40 to the body section 10 is substantially midway between the ends of the latter, as shown by Figs. 2 and 6. As a result, the spring clips 40 being under tension in application, will tend to draw the body parts together, and in consequence thereof, these companion elements 11 and 12 coact at their opposite corresponding ends to effect the desired frictional engagement with the bracket arm 5 and annulus 28 of joint member 14.

It will be now observed that I have provided an especially compact joint which fully attains all of the objects herein expressed, as well as other objects and advantages now readily apparent. By reason of its substantially universal adjustability, my improved joint is particularly suitable for use in articulated brackets for supporting electrical devices such as lighting fixtures and the like.

Having described my invention in connection with the disclosure herein, of a preferred embodiment thereof, what I regard as new and desire to secure by Letters Patent is:

1. A joint of the character described comprising an elongated body divided longitudinally into sections and having an axial bore at one end to receive an end portion of a bracket member, said sections at the opposite end of the body being formed to provide spaced bearing arms, cavities to accommodate electrical conductors formed in the inner sides of the bearing arms, a joint member having an annular head portion rotatably positioned between said bearing arms, ring elements interposing the adjacent mating surfaces of said head portion, and means preventing rotation of said ring elements with respect to the bearing arms, said ring elements providing facings for the edge surfaces of said head portion such as are exposed to the electrical conductors in said cavities, whereby to protect said conductors against rubbing contact with said head portion, and resilient clips interconnecting adjacent external marginal portions of said sections for holding the recited parts in assembly.

2. In a joint for connecting adjacent arms of an adjustable fixture bracket, a hollow elongated body divided longitudinally into paired sections, said sections being formed to provide an axial bore at one end of the body to receive and be rotatably mounted on the end portion of a bracket arm, said sections at the opposite end of the body being marginally recessed and formed to provide an opening flanked by arcuate faces on the opposed margin of said sections, bearing rings fixedly disposed on said arcuate bearing faces, an annular member having a tubular neck extending radially therefrom to receive the end portion of a second bracket arm, said annular member being rotatably mounted in the body between said bearing rings, and externally mounted, U-shaped resilient clips embracing adjacent marginal portions of said sections, said clips holding the body sections in pressure engagement with the first said bracket arm at one end of said body and with said annular member at the opposite end of the body, whereby frictionally to restrain relative rotation of these members in the body.

ALBERT C. PERBAL.